(12) United States Patent
Yamazoe (10) Patent No.: US 9,742,955 B2
(45) Date of Patent: Aug. 22, 2017

(54) IMAGE PROCESSING APPARATUS, IMAGE PROCESSING METHOD, AND STORAGE MEDIUM

(75) Inventor: Manabu Yamazoe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

(21) Appl. No.: 13/551,488

(22) Filed: Jul. 17, 2012

(65) Prior Publication Data

US 2013/0022239 A1 Jan. 24, 2013

(30) Foreign Application Priority Data

Jul. 23, 2011 (JP) ................................ 2011-161439

(51) Int. Cl.
*H04N 1/21* (2006.01)
*H04N 5/14* (2006.01)

(52) U.S. Cl.
CPC ....... *H04N 1/212* (2013.01); *G03B 2217/005* (2013.01); *G06T 2207/30168* (2013.01); *H04N 5/145* (2013.01)

(58) Field of Classification Search
CPC ........... G06T 5/003; G06T 2207/20201; G06T 2207/30168; G06T 7/0065; G06T 7/20; G06T 7/2006; G06T 7/001; G06T 7/0075; G06T 7/204; G06T 7/0044; G06T 7/2013; G06T 2207/10021; G06T 7/0002; G06T 5/50; G06T 7/223; H04N 5/23251; H04N 5/23264; H04N 5/145; H04N 19/00678; H04N 2013/0081; H04N 1/212; G03B 2217/005; G06F 17/30247

USPC .......................................... 382/103, 275, 255
See application file for complete search history.

(56) References Cited

U.S. PATENT DOCUMENTS

| | | | |
|---|---|---|---|
| 2004/0066970 A1* | 4/2004 | Matsugu | 382/217 |
| 2004/0175035 A1* | 9/2004 | Kameyama | G06T 7/2006 382/173 |
| 2006/0036948 A1* | 2/2006 | Matsuzaka | G11B 27/28 715/723 |
| 2006/0159364 A1* | 7/2006 | Poon | H04N 5/23248 382/275 |
| 2007/0140674 A1* | 6/2007 | Nomura et al. | 396/52 |

(Continued)

FOREIGN PATENT DOCUMENTS

| | | |
|---|---|---|
| JP | 4301236 B2 | 7/2009 |
| JP | 2009-213114 A | 9/2009 |

(Continued)

*Primary Examiner* — Kenny Cese
(74) *Attorney, Agent, or Firm* — Canon USA, Inc. I.P. Division (57) ABSTRACT

An image processing apparatus is capable of appropriately extracting a frame of an output target from a moving image. The image processing apparatus includes an analysis unit configured to analyze a plurality of analysis regions in each of a plurality of frames included in the moving image, an extraction unit configured to extract the frame of the output target from among the plurality of frames by comparing analysis results of the plurality of analysis regions in each of the plurality of frames analyzed by the analysis unit for each analysis regions corresponding to each other between the plurality of frames, and an output unit configured to output the frame of the output target extracted by the extraction unit.

18 Claims, 5 Drawing Sheets

(56) References Cited

U.S. PATENT DOCUMENTS

| | | | | |
|---|---|---|---|---|
| 2009/0096879 A1* | 4/2009 | Motomura | ............... | G03B 5/00 |
| | | | | 348/208.6 |
| 2009/0304234 A1* | 12/2009 | Kondo et al. | ................. | 382/103 |
| 2009/0324016 A1* | 12/2009 | Ikeda et al. | ................... | 382/103 |
| 2010/0020244 A1* | 1/2010 | Mitsuya et al. | .............. | 348/699 |
| 2010/0209009 A1* | 8/2010 | Matsunaga | ........ | H04N 5/23232 |
| | | | | 382/224 |
| 2012/0002842 A1* | 1/2012 | Murashita | .......... | H04N 5/23248 |
| | | | | 382/103 |
| 2012/0027295 A1* | 2/2012 | Shao | ................ | G06F 17/30781 |
| | | | | 382/170 |
| 2012/0082389 A1* | 4/2012 | Sakamoto | ..................... | 382/224 |
| 2012/0249826 A1* | 10/2012 | Kobayashi | ............. | G06K 9/036 |
| | | | | 348/222.1 |

FOREIGN PATENT DOCUMENTS

| | | | | |
|---|---|---|---|---|
| JP | 2010-119097 A | 5/2010 | | |
| JP | WO 2010116400 A1 * | 10/2010 | ......... | H04N 5/23248 |
| JP | WO 2011074049 A1 * | 6/2011 | ............. | G06K 9/036 |
| WO | WO 2011074049 A1 * | 6/2011 | | |

\* cited by examiner

IMAGE PROCESSING APPARATUS, IMAGE PROCESSING METHOD, AND STORAGE MEDIUM

BACKGROUND OF THE INVENTION

Field of the Invention

The present invention relates to an image processing apparatus for extracting a frame of an output target from a plurality of frames constituting a moving image, an image processing method, and a storage medium.

Description of the Related Art

Conventional apparatuses including a moving-image replay function include a function for extracting, from a moving image, a still image constituting the moving image. Using a function of this type, when a user specifies a frame of an extraction target from a plurality of frames included in the moving image, an image of the specified frame is transmitted to a display device such as a liquid crystal monitor to be displayed thereon. In addition, the frame extracted from the moving image can be outputted to a print device to print the image corresponding to the frame on a print sheet.

Of the still images included in the moving image, the still image photographed when a hand of a photographer or an object moves may have a shake, and thus such an image may not be preferable as an output target. Japanese Patent Application Laid-Open No. 4301236 discusses a technique in which moving image data is analyzed to acquire an amount of shake of each frame included in the moving image, a reference frame is determined based on the acquired amount of the shake, and then peripheral frames within a predetermined range of the reference frame are output.

As a method for determining the amount of the shake of the image, the above-described conventional technique discusses a method for determining the amount of the shake based on an amount of movement, between the frames, of a feature point included in the frame.

However, even though the feature point included in the frame moves between the frames, it cannot be specified whether the feature point is moved due to the shake of a photographing apparatus or a movement of the object. Thus, even if the amount of the movement of the feature point between the frames is small and thus the amount of the shake of the characteristic point is small, the moving image may be photographed according to the movement of the object corresponding to the feature point. Further, at this point, even if the amount of the shake of the feature point is small, the amount of the shake of other region than the feature point in the frame may be large, and thus the frame may not be preferable as the output target.

SUMMARY OF THE INVENTION

The present invention is directed to providing an image processing apparatus being capable of appropriately extracting a frame of an output target from a moving image, an image processing method, and a storage medium.

According to an aspect of the present invention, an image processing apparatus including an analysis unit configured to analyze a plurality of analysis regions in each of a plurality of frames included in the moving image, an extraction unit configured to extract the frame to be output from among the plurality of frames by comparing analysis results of the plurality of analysis regions in each of the plurality of frames analyzed by the analysis unit for each analysis regions corresponding to each other between the plurality of frames, and an output unit configured to output the frame of the output target extracted by the extraction unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
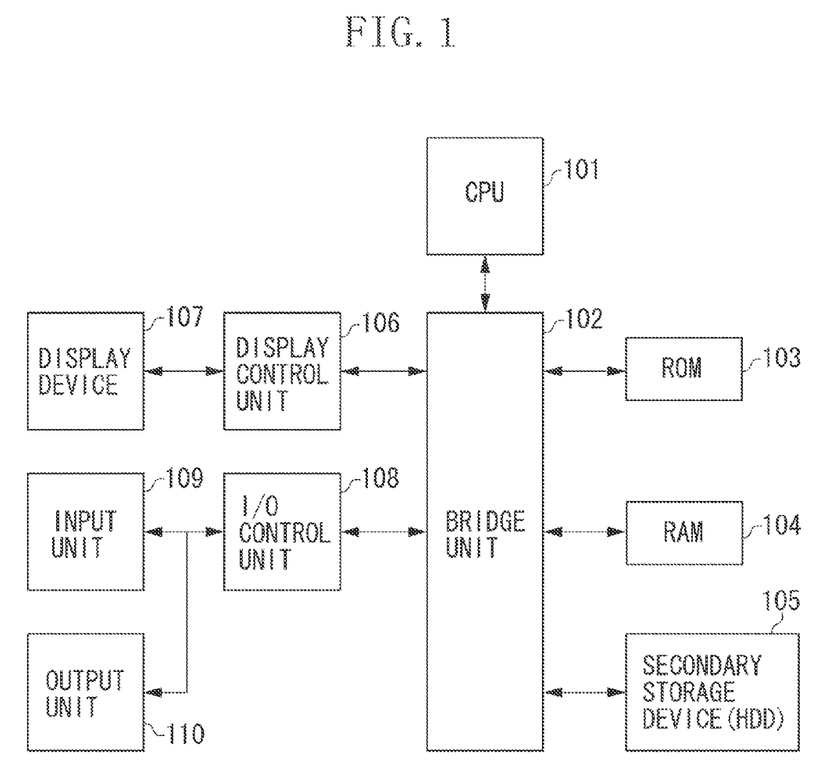
FIG. 1 is a block diagram illustrating an image processing apparatus.

FIG. 1 is a block diagram of an image processing apparatus used for the present invention. A personal computer (PC) is used in an image processing method.

A central processing unit (CPU) 101 controls other function blocks or devices. A bridge unit 102 provides a function for controlling transmission and reception of data between the CPU 101 and the other function block.

A read-only memory (ROM) 103 is a non-volatile read-only memory and stores a program referred to as a Basic Input/Output System (BIOS). The BIOS is firstly performed when the image processing apparatus is activated, and controls basic input/output functions of peripheral devices including a secondary storage device 105, a display device 107, an input device 109, and an output device 110.

A random access memory (RAM) 104 provides a high-speed readable/writable storage region.

The secondary storage device 105 is a hard disk drive (HDD) providing a storage region having a great amount of capacity. When the BIOS is performed, an operating system (OS) stored in the HDD is performed. The OS provides a basic function that can be used by all applications, management of an application, and a basic graphical user interface (GUI). A user interface (UI) that can realize a function unique to the application can be provided by combining the GUIs provided by the OS with each other.

The above-described OS, implementation programs for other applications, and data used for operations are stored in the ROM 103 or the secondary storage device 105 as necessary. Further, the image processing application performing the processing of the present exemplary embodiment is stored in the ROM 103 or the secondary storage device 105, and provided as an application activated by a user's operation. The processing described below can be realized when the CPU 101 executes the OS and the programs such as the image processing application stored in the ROM 103 and the secondary storage device 105 using the RAM 104 as a work memory.

The display control unit 106 performs control for displaying various types of images on the display device 107. For example, the images stored in the secondary storage device 105, and the GUI images indicating results of the user's operation performed for the OS or the application are displayed. A liquid crystal display and a cathode ray tube (CRT) display can be used as the display device 107.

An input/output (I/O) control unit 108 provides an interface between a plurality of input devices 109 and output devices 110. A typical interface is, for example, a universal serial bus (USB) and a Personal System/2 (PS/2).

An input device 109 is an operation device such as a keyboard and a mouse. The I/O control unit 108 inputs a user's instruction to the image processing apparatus via the input device 109.

The I/O control unit 108 connects various types of output devices 110 and transmits data thereto. The output device 110 is a printer, for example. When the I/O control unit 108 outputs print data to the output device, the output device 110 can print the image corresponding to the print data.

A storage device such as a digital camera, a USB memory, a compact flash (CF) memory, and a Secure Digital (SD) memory card can be connected to the image processing apparatus. Further, the I/O control unit 108 can transfer the data such as the image data to the digital camera and the memory, and can also acquire the data from the digital camera and the memory.

According to the present exemplary embodiment, as described below, the frame is extracted from the moving image constituted by a plurality of frames. The data of the moving image is supplied from the above-described secondary storage device 105, the USB memory, the CF memory, and the SD memory card connected to the image processing apparatus.

Frame extracting processing according to the present exemplary embodiment will be described below.

According to the present exemplary embodiment, when the frame included in the moving image is extracted, an amount of shake and blur is determined, and then a frame having a small amount of the shake and blur is extracted as an output target. That is because, in the case of the moving image particularly, brightness and color in continuous frames may slightly vary, and also a slight movement of a main object, which may cause, affected by compression, the shake and blur. Further, if the characteristic of a scene greatly varies, the varied characteristic itself causes the shake and blur. Thus, when the frame is extracted from the moving image, the shake and blur in the frame needs to be determined to extract an appropriate frame as the output target.

According to the present exemplary embodiment, furthermore, when the shake and blur in the frame is determined, analysis results of the shake and blur in a plurality of regions in the frame is used.

This is because the analysis result in only one region in the frame may not be able to appropriately evaluate the shake and blur in the frame. This case will be described with reference to FIG. 5.

Figure 5:
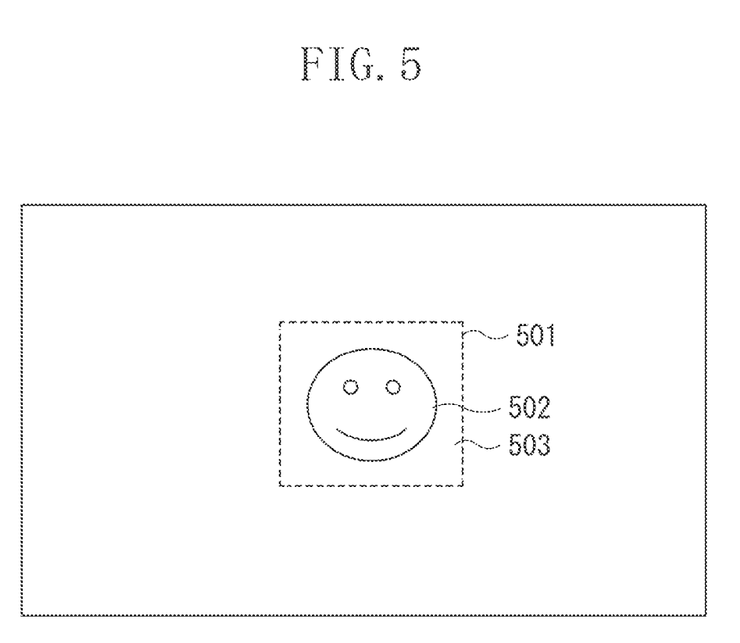
FIG. 5 illustrates a frame in a moving image.

FIG. 5 illustrates a frame included in the moving image. In FIG. 5, an analysis region 501 is set near a main object 502 to determine the shake and blur in the analysis region 501. For example, when the main object 502 is moving at a certain speed, if the object is photographed with the camera as being synchronized with the movement of the object, the object can be focused but background may have the shake.

Therefore, even if one analysis region 501 has the small amount of the shake and blur, other regions than the analysis region 501 may have a large amount thereof, and thus the image may not be preferable as the frame of the output target.

Further, a background region 503, which is not the main object 502 in the analysis region 501, may have the large amount of the shake as described above. Thus, if the shake and blur in the frame is determined using one analysis region 501, the determination result may greatly vary depending on a method for setting the one analysis region.

Particularly, when the moving image is photographed, if the moving image is photographed by a photographing method in which a region to be focused on is more limited, difference in the amount of the blur between the main object and the background is large. For example, if the photographing is performed with a diaphragm of a lens opened (with a focus 'F' value decreased), a range of a depth of field to be focused on is small. In this case, the background becomes blurred relative to the focused object. In particular, if the photographing is performed with the "F" value decreased using a bright lens, the region to be strictly focused on is limited also in an object region.

When the analysis region 501 is set for the region to be focused on, even if the main object has the small amount of the shake and blur in the one analysis region 501, the background may have the large amount of shake and blur. Further, depending on how much of the background region 503 is included in the one analysis region 501, evaluation of the shake and blur in the frame particularly, greatly varies. In other words, the shake and blur in the entire frame may not be able to be appropriately evaluated according to the setting of the one analysis region 501.

Therefore, according to the present exemplary embodiment, a plurality of analysis regions are set for one frame and, based on the analysis result of the plurality of analysis regions, an appropriate frame as the output target is extracted from among a plurality of frames.

Figure 2:
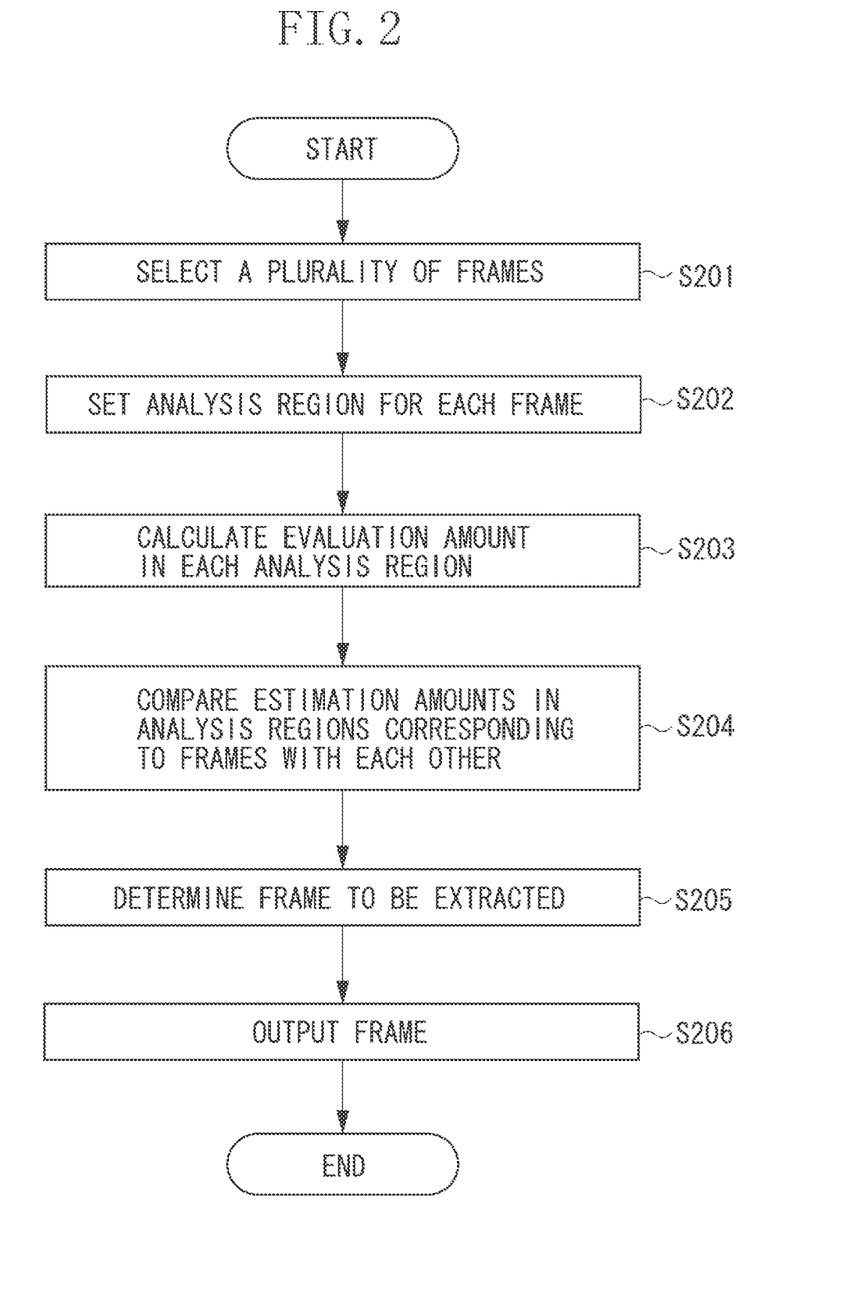
FIG. 2 is a flowchart illustrating frame extracting processing.

FIG. 2 is a flowchart illustrating a frame extracting processing according to the present exemplary embodiment. A program corresponding to this flowchart is stored in the ROM 103 or the secondary storage device 105. The CPU 101 reads out the program into the RAM 104 and executes it, so that the processing illustrated in the flowchart of FIG. 2 can be realized.

In step S201, from among the plurality of frames included in the moving image data, a plurality of frames of an analysis target is selected. In step S202, for each of the plurality of frames selected in step S201, a plurality of analysis regions is set that is a target of analysis processing for determining the amount of the shake and blur. In step S202, as described above, the plurality of analysis regions are set. Details of the plurality of analysis regions will be described with reference to FIG. 4 below.

In step S203, image quality evaluation is performed in the frame on each of the plurality of analysis regions set in step S202. As an image evaluation method, particularly, the amount of the shake and blur included in the analysis region is estimated herein. A known technique may be used as a method for estimating the amount of the shake and blur. For example, an amount of edge of the analysis region is calculated as an evaluation value of the amount of the shake or that of the blur.

In step S204, the image quality evaluation values in the respective analysis regions corresponding to each other between the peripheral frames are compared with each other. In step S205, based on the comparison result of the image quality evaluation values of each other, a frame of the output target is finally determined and extracted.

In step S206, the frame of the output target extracted in step S205 is outputted. For example, the frame extracted from the moving image data may be displayed on the display device 107 by the display control unit 106. Alternatively, print data corresponding to the frame extracted from the moving image data may be outputted to the output device 110, which is a print device, and then the image corresponding to the frame may be printed on print medium.

Figure 3:
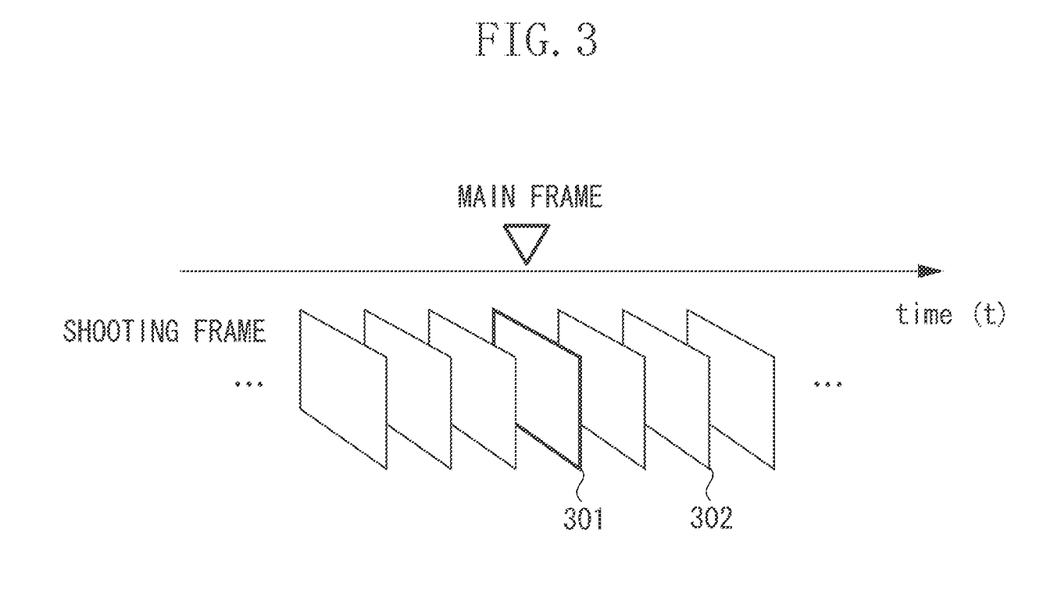
FIG. 3 illustrates a plurality of frames included in a moving image.

Selection of the frame of the analysis target in step S201 described above will be described with reference to FIG. 3 herebelow. FIG. 3 illustrates a plurality of frames included in the moving image. Instep S201, from among a series of frames included in the moving image, a main frame 301 is determined. The frame is specified by the user using the input device 109. Alternatively, the plurality of frames specified for each predetermined number of frames from among all frames of the moving image may be set as the respective main frame 301.

The frame near the main frame 301 is set as a peripheral frame 302. Frames continuing to the main frame may be used as a peripheral frame, or the peripheral frames may be set at a predetermined interval in a range having substantially same scene characteristics.

In step S201, the main frame 301 and the peripheral frames 302 corresponding to the main frame 301 are selected as the plurality of frames (frame group) of the analysis target on which analysis for determining the shake and blur is performed. In step S205, based on the analysis result of the frames in steps S202 to S204, the frame having the small amount of shake and blur is extracted as the frame of the output target from among the plurality of frames of the analysis target.

Setting of the analysis region in the frame in step S202 will be described in detail.

Figure 4:
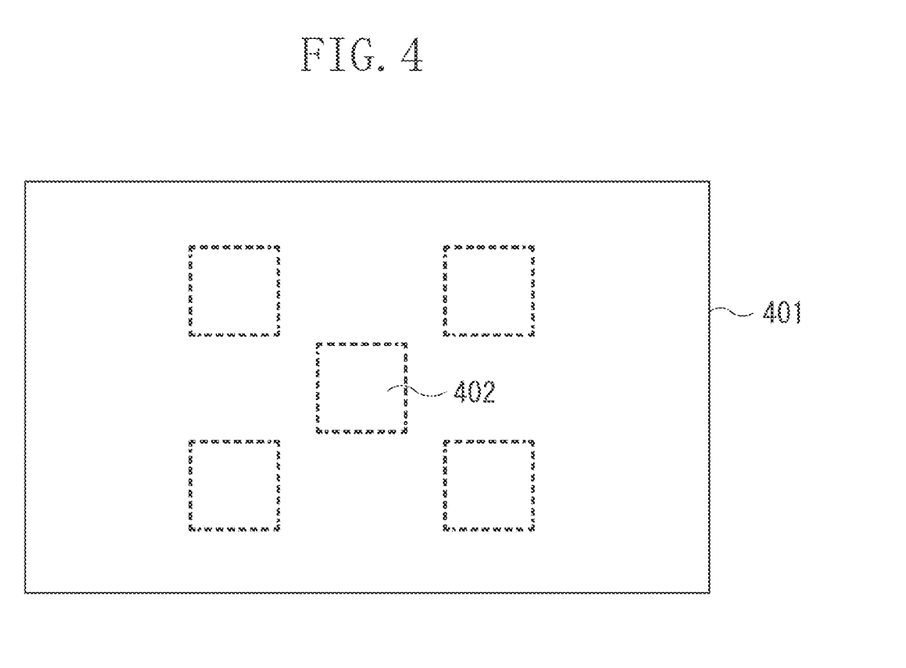
FIG. 4 illustrates an analysis region set for a frame.

FIG. 4 illustrates the analysis region set in the frame. In step S202 illustrated in FIG. 2, the plurality of analysis regions illustrated in FIG. 4 is set. According to the example illustrated in FIG. 4, five analysis regions 402 are set for each of the plurality of frames selected in step S201.

According to the present exemplary embodiment, the analysis region is set for the frame included in the moving image having full high definition (HD) image quality of 1,920×1,080 pixels, and five analysis regions 402 having a size of 128×128 pixels are set as illustrated in FIG. 4. The size of the analysis region 402 may be set according to the number of pixels of the moving image.

In step S203 illustrated in FIG. 2, the analysis for determining the shake and blur is performed for each of five analysis regions in one frame. Depending on the amount of the shake and blur acquired by the analysis, the evaluation value indicating the image quality of each of the analysis regions is determined. The evaluation value is stored in the RAM 104, for example. The evaluation value is acquired by quantifying the amount of the shake and blur of the image data in the analysis region. According to the present exemplary embodiment, the evaluation value is set with a score, which increases in proportion to the amount of the shake and blur. However, on the other hand, a 100 perfect score may be defined for no shake and no blur, and a score of the evaluation value may be set to be decreased along with an increasing amount of the shake and blur.

In step S204 illustrated in FIG. 2, each of the evaluation value of the five analysis regions is compared between frames. At this point, the evaluation values are compared for the respective corresponding analysis regions of each frame. Specifically, two frames are selected from among the main frame and the peripheral frames thereof, and the evaluation values of the five analysis regions of the respective two frames acquired in step S203 are compared with each other. At this point, the analysis regions corresponding to each other between the two frames are compared with each other. For example, the analysis regions disposed in the center of the two frames are compared with each other. A user frequently photographs an image such that a main object is arranged in the center of the frame. Therefore, as described above, by comparing the analysis regions in the center of the frames with each other, the shake and blur can be determined for the object common to the two frames.

Further, when the evaluation values of the respective analysis regions between the two frames are compared with each other, the comparison is performed by a "winning point method". In the "winning point method", the evaluation values of certain analysis regions are compared with each other between the two frames. When difference between both evaluation values is a predetermined value or more, the winning points 3 is given to the analysis region in the frame having the higher evaluation value. When the difference between the evaluation values of the two frames is less than the predetermined value, it is considered to be drawn, and the winning point 1 is given to the analysis regions in the two frames. The comparison processing is performed on the five analysis regions. The winning points given to the respective five analysis regions in one frame are added up, and the added winning points are defined as a frame evaluation value of the frame.

The comparison processing between the two frames is performed on the plurality of frames selected in step S201 to be compared with all frames except for itself. Each time the comparison processing between the two frames is performed on the two frames, the frame evaluation value is added to the respective two frames.

In step S205, based on the frame evaluation value finally added, the frame of the output target is extracted. In step S205, a frame having the highest evaluation value is determined to be an optimum frame of the extraction target, and then the optimum frame is determined as the extraction frame. However, a plurality of frames satisfying a predetermined evaluation value may be also determined as the extraction frame.

As described above, according to the present exemplary embodiment, a plurality of analysis regions are set for one frame, and based on the analysis results of the plurality of analysis regions, the shake and blur of the frame is determined. As described above, when the shake and blur is determined with one analysis region, according to the analysis result of the one analysis region, the evaluation of the shake and blur of the frame may greatly vary, and thus the image quality of the frame may not be appropriately evaluated.

On the other hand, according to the present exemplary embodiment, since the plurality of analysis regions are set, even if the shake and blur of the frame cannot be appropriately determined in one analysis region, the determination can be appropriately performed in consideration of other analysis regions.

As described above, according to the present exemplary embodiment, the peripheral frame 302 is selected with respect to the main frame 301, and the main frame 301 and the peripheral frame 302 are defined as a frame group to be analyzed. When the scene is changed in the frame group, the frames corresponding to a plurality of scenes are included in the frame group. In this case, it is useful to extract the frames having the small amount of the shake and blur from each of the plurality of scenes, rather than extracting the frame including any of scenes based on the amount of the shake and blur.

Normally, it depends on a photographing scene though, if the frames have the interval of 0.5 sec or more to less than 1 sec, it is assumed that the scene does not greatly vary. Thus, if a range of the peripheral frame is limited to a range of 0.5 sec or more to less than 1 sec, variation of the scene characteristics can be decreased. With this arrangement, in the frame group which is the analysis target of the shake and blur, the scene can be prevented from being changed. In step S202, before the shake and blur is determined, the plurality of frames that are candidates for the determination target of the shake and blur are analyzed, and then the scenes of the plurality of frames may be specified. When the plurality of frames correspond to a plurality of scenes, the user may select any of them or, the frame including the scene same as that of the main frame may be selected as the frame which is the determination target of the shake and blur.

A size of the analysis region illustrated in FIG. 4 will be described herebelow. As described in FIG. 5, the key factor is that the size of the analysis region is set such that the background is not included as much as possible. The size of the analysis region may be determined based on an assumed photographing scene. Specifically, assuming that a moving child is photographed with a moving image, the size of the analysis region is set to include a entire body of the child in the frame having the full HD image quality (1,920×1,080 pixels). When the object is photographed at 80 percent of the 1,080 pixels in a vertical direction of the frame, and then it is converted into one sixth to one fifth of the 80 percent thereof, which is 144 to 172 pixels. The size of the analysis region may be set equal to or smaller than thereof. As described above, when the size of the analysis region is determined based on a ratio of the size of the object relative to the size of the frame, the number of pixels of the analysis region may be determined according to the number of the pixels of the entire frame.

Regarding a method for arranging the plurality of analysis regions illustrated in FIG. 4, the key factor is that regions not to be analyzed need to be intentionally, appropriately set. In other words, even if the analysis regions having a predetermined size are closely arranged over the entire frame, in the assumed scene as described above, most of the background may be flowing background. Therefore, even if the frames including the estimated scene are analyzed, accuracy of extracting the frames cannot be improved, and thus the analysis regions need to be set at appropriate portions in the frame.

Since the user tends to desire the frame of the object having the small shake and blur as the output target, it is desirable that the main object be included in the analysis region to be used to evaluate the shake and blur in the frame.

Particularly, when the moving image is photographed, a photographer tends to photograph the specific object noticed by himself or herself in the center of an image. In other words, the main object is often included in a center portion of the frame, and the specific object is often included in the center portion thereof in the plurality of continuous frames in the moving image. As illustrated in FIG. 4, the analysis regions are mainly set at the center portion of the frame.

On the other hand, the specific object noticed by the photographer is not normally included in an end portion of the frame. When the object is moving, the scene can be changed at the end portion of the frame during even a small lapse of time. In the plurality of continuous frames in the moving image, content is often changed at the end portion of the frame. Thus, as illustrated in FIG. 4, the analysis region is not to be set at the end portion of the frame.

Assuming that the main object may be photographed in the center of a photographing composition or near four crossing points (referred to as "golden separation points") of lines that separate the photographing region into substantially nine equal parts, the above-described regions in which the main object is photographed can be arranged as the analysis region. According to the example illustrated in FIG. 4, as the points at which the main object can be photographed, the analysis regions are arranged in the center of the frame and four golden separation points. Alternatively, the analysis region may be arranged around a focal point of a camera as a center. This is because, as control for photographing with the camera, if focal control is performed at the focal point, a focus can be adjusted around the focal point.

According to the example illustrated in FIG. 4, five analysis regions are set, however, the present invention is not limited thereto, and a plurality of analysis regions of six or more or four or less may be set.

Further, as described above in the exemplary embodiment, based on the analysis result of each of the plurality of analysis regions, the frame of the output target is extracted. However, the analysis result may be weighed depending on the analysis region. At this point, of the plurality of analysis regions, the analysis region arranged at a more important position is weighed. For example, to put more emphasis on the analysis region arranged in the center of the frame than other analysis regions, when the above-described "winning point method" is performed for the determination, the winning point given to the analysis region disposed in the center of the frame is doubled, and the winning point given to the frame is calculated.

As described above, when the analysis region is set, the size of the region is set according to the number of the pixels of the moving image. Whether the size setting is appropriate may depend on the content of the image and photograph information (performance of a lens and setting values of a camera at the timing of photographing). A method for setting the size based on the content of the image and the photograph information will be described.

According to the description above, as the content of the image, in consideration of the size of the object with respect to the frame, the analysis region having the predetermined size is set. The frame is analyzed to determine the size of the object included therein. According to the size of the object, the size of the analysis region is determined. For example, using a known face detecting technique, a face is detected as the object, and the size of the analysis region is determined according to the size of the detected face. At this point, depending on a position of the face in the frame, the position of the analysis region may be determined. For example, when a plurality of faces are detected in an image, the analysis regions having the size according to the size of the face may be set at respective positions of the plurality of faces.

Further, the photograph information includes a focal (F) value indicating brightness of the lens and a focal distance. As described above, the smaller the "F" value is, the smaller the size of the region to be focused becomes. Furthermore, when a telescopic lens is used for photographing, generally, the shake is likely to occur. Therefore, based on such camera information, the analysis size may be adjusted. For example, as described above, when the "F" value is small, the size of the analysis region may be set smaller than normal not to include the objects having the different amounts of blur in the analysis region.

The photograph information corresponding to the above-described moving image is stored in a header portion of a moving image file when the moving image is photographed. By referring to the above-described header portion of the moving image file stored in the memory, the "F" value and a type of the lens can be determined.

According to the above description, when the preferable frame is extracted from among the continuous moving image frames, the image quality between the frames is compared based on the analysis regions corresponding to each other between the two frames, in other words, the evaluation values of the same locations in the two frames.

However, in the assumed scene as described above, the object may move. According to the present exemplary embodiment, it is assumed that the object moves while the camera also moves, thereby causing the entire background becomes flowing background.

In such an assumed scene, the main object has the small amount of the shake, while the background has a large amount thereof. Therefore, the analysis region including the main object has the extremely higher evaluation value than those of other analysis regions. In other words, at least one analysis region may be included that has the prominent evaluation value relative to those of other analysis regions. Further, when the object moves and is captured in another analysis region, similarly, the evaluation value of the other analysis region becomes prominent compared to those of other analysis regions.

In this case, of the plurality of analysis regions in the frame, the frame including the analysis region having the particularly high evaluation value may be preferentially extracted. With this extraction, the frame including the moving main object can be extracted. For example, distribution of the evaluation values of the plurality of analysis regions set for each frame is analyzed, and the analysis regions in the frame are compared to each other to determine whether the frame includes the analysis region having the prominently high evaluation value. Subsequently, the plurality of frames including the analysis regions satisfying such a standard may be selected from among the plurality of frames to determine the frame to be extracted from among the plurality of frames based on the evaluation values of the above-described analysis regions. With this determination, from the frames photographed while the camera is being appropriately moved corresponding to the movement of the main object (frame having the small amount of the shake and blur in the main object), the image having the small amount of the shake especially in the background can be selected.

According to the above-described exemplary embodiment, the plurality of analysis regions are set for one frame, and then the shake and blur of the frame is determined based on the analysis results of the plurality of analysis regions. With this arrangement, even if the shake and blur cannot be appropriately determined in one analysis region, the appropriate determination can be performed in consideration of other analysis regions.

Accordingly, for example, when the frame of the output target is extracted from among the plurality of frames included in the moving image, the frame having the small amount of the shake and blur can be extracted. The output processing of various types can be performed, for example, the frame extracted from the moving image by such a method can be displayed, or the frame can be printed by the print device. In such a case also, according to the present exemplary embodiment, since the image having the small amount of the shake and blur can be extracted, the appropriate image can be extracted to be displayed and printed. When the frame is extracted from the moving image as described above, the plurality of frames extracted from the moving image may be aligned to be displayed and printed, or the plurality of frames may be combined to be displayed and printed.

According to the exemplary embodiment described above, as the method for evaluating the image quality, the method is described for performing the evaluation based on the determination of the amount of the shake and blur, however in addition, the evaluation method may be performed based on various analysis results of the image quality such as color as the image quality, adequateness of contrast, and a feeling of noise. As described above, various modification can be used as the image quality evaluation method.

The processing of the exemplary embodiment as described above is not limited to be performed when the frame is extracted from the moving image, but can be applied to extract a still image from among the plurality of still images at an interval according to a user's instruction. For example, the processing can be used when the image having the small amount of the shake and blur is extracted at the interval specified by the user so that the user can instantly grasp the great amount of the content of the still images archived in a computer.

The image processing apparatus described above in the exemplary embodiment includes the display device 107 and the output device 110, however, the image processing apparatus may cause an external display device connected to the image processing apparatus to display the image or an external output device connected to the image processing apparatus to output the image. As an example of the image processing apparatus, various devices may be used, for example, a personal computer (PC), an image pickup apparatus such as a digital still camera and a digital video camera, a print device, and a mobile device such as a cellular phone.

A method is also included in the above-described exemplary embodiment for storing the program for operating the configuration of the above-described exemplary embodiment in the non-transitory recording medium to realize the functions of the above-described exemplary embodiment, and for reading the program stored in the non-transitory recording medium as a code, and then executing the program in the computer.

The non-transitory recording medium is a computer-readable non-transitory recording medium. Further, the non-transitory recording medium in which the above-described program is stored and also the program itself are included in the above-described exemplary embodiment. As such a non-transitory recording medium, for example, a flexible disk, a hard disk, an optical disk, an optical magnetic disk, a compact disk (CD)-ROM, a magnetic tape, a non-volatile memory card, and the ROM can be used.

Further, in addition to the program stored in non-transitory recording medium solely performing the processing, the program operating on the OS and performing the operation of the above-described exemplary embodiment in cooperation with functions of other software and an extension board is also included in the above-described exemplary embodiment.

Furthermore, the present invention can be realized not only when one processor executes the program but also when a plurality of processors cooperate with each other.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-161439, filed Jul. 23, 2011, which is hereby incorporated by reference herein in its entirety.

What is claimed is:

1. An apparatus comprising:

a memory; and a processor coupled to the memory which executes the following:

analyzing shake included in each of first regions in a first frame in a plurality of frames in a moving image, using image data of the first frame and without using any image data of another frame;

analyzing shake included in each of second regions in a second frame in the plurality of frames, using image data of the second frame and without using any image data of another frame;

calculating first evaluation values of the first regions using first analysis results of the first regions and without using any analysis results of another frame, such that a first evaluation value for a first region corresponding to a focus point of a camera among the first regions is weighted more than that for other regions among the first frame;

calculating second evaluation values of the second regions, using second analysis results of the second regions and without using any analysis result of another frame, such that a second evaluation value for a second region corresponding to the focus point of a camera among the second regions is weighted more than that for other regions among the second frame;

comparing, for the first frame and the second frame, the first evaluation values and the second evaluation values, in a manner such that each of the first evaluation values of the first regions is individually compared with a second evaluation value of a corresponding region among the second regions, assigning a first point or a second point to one region among the first regions or the corresponding region among the second regions, based on the comparison result, wherein the first point is assigned to a region having a higher evaluation value out of the one region and the corresponding region, in a case where difference between the first value and the second value is equal to or greater than a predetermined value, and the second point smaller than the first point is assigned to both of the one region and the corresponding region in a case where the difference is smaller than the predetermined value, wherein a frame evaluation of each of the first frame and the second frame is defined based on total points given to each of the first frame and the second frame, determining an output target frame, from the plurality of frames, based on the frame evaluation value of each of the plurality of frames, and outputting the determined output target frame, wherein the comparison between the first frame and the second frame is performed on the plurality of frames to be compared with all of the plurality of frames except for itself, wherein each time the comparison between the first frame and the second frame is performed on the first frame and the second frame, the frame evaluation value is added to the respective first frame and the respective second frame, and wherein a frame having the highest frame evaluation value which is finally added, is determined as the output target frame.

2. The apparatus according to claim 1, wherein in a case where a first region includes a content region corresponding to a content and a background region corresponding to a background, and a second region includes a content region corresponding to the content and a background region corresponding to the background, analysis results of the content regions are compared with each other and analysis results of the background regions are compared with each other.

3. The apparatus according to claim 1, further comprising determining a size of each of the first regions in the first frame and a size of each of the second regions in the second frame based on the first frame and the second frame, and then executes the analysis to each of the first regions of the determined size and each of the second regions of the determined size.

4. The apparatus according to claim 3, further comprising specifying an object region corresponding to an object in the first frame or the second frame, and determining the size of each of the first regions and the size of each of the second regions, according to a size of the specified object region.

5. The apparatus according to claim 3, wherein each of the first frame and the second frame is a frame which has been photographed by the camera, and the processor determines the size of each of the regions according to photograph information corresponding to the first frame or the second frame.

6. The apparatus according to claim 1, further comprising determining, with respect to each of the first frame and the second frame, positions of the first regions and the second regions such that more regions are arranged at a center portion of each of the first frame and the second frame than at an end portion thereof.

7. The apparatus according to claim 1, wherein the processor selects the plurality of frames included in the moving image, according to an instruction by a user.

8. The apparatus according to claim 7, wherein the processor selects frames specified for every predetermined number of frames, and a frame in the plurality of frames is included in the selected frames and the other frames in the plurality of frames are selected based on the first image.

9. The apparatus according to claim 1, wherein the processor causes a display device to display the output target frame.

10. The apparatus according to claim 1, wherein the processor causes a printing device to print the output target frame.

11. The apparatus according to claim 1, wherein the processor sets the first regions in the first frame and the second regions in the second frame, so that the first regions in the first frame are positioned identically to the second regions in the second frame, and wherein the processor executes the comparison to each of the first regions and each of the second regions disposed in the same position in each of the first frame and the second frame.

12. The apparatus according to claim 1, wherein the processor determines the output target frame, so that a comparison result for a region corresponding to a predetermined position in the first frame is more weighed than that for another region.

13. The apparatus according to claim 12, wherein the predetermined position is a center of the first frame.

14. A method performed by a processor by executing a program stored in a memory, the method comprising:
analyzing shake included in each of first regions in a first frame in a plurality of frames in a moving image, using image data of the first frame and without using any image data of another frame;
analyzing shake included in each of second regions in a second frame in the plurality of frames, using image data of the second frame and without using any image data of another frame;
calculating first evaluation values of the first regions using first analysis results of the first regions and without using any analysis results of another frame, such that a first evaluation value for a first region corresponding to a focus point of a camera among the first regions is weighted more than that for other regions among the first frame;
calculating second evaluation values of the second regions, using second analysis results of the second regions and without using any analysis result of another frame, such that a second evaluation value for a second region corresponding to the focus point of a camera among the second regions is weighted more than that for other regions among the second frame;
comparing, for the first frame and the second frame, the first evaluation values and the second evaluation values, in a manner such that each of the first evaluation values of the first regions is individually compared with a second evaluation value of a corresponding region among the second regions;
assigning a first point or a second point to one region among the first regions or the corresponding region among the second regions, based on the comparison result,
wherein the first point is assigned to a region having a higher evaluation value out of the one region and the corresponding region, in a case where difference between the first value and the second value is equal to or greater than a predetermined value, and the second point smaller than the first point is assigned to both of the one region and the corresponding region in a case where the difference is smaller than the predetermined value,
wherein a frame evaluation value of each of the first frame and the second frame is defined based on total points assigned to each of the first frame and the second frame,
determining an output target frame, from the plurality of frames, based on the frame evaluation value of each of the plurality of frames; and
outputting the determined output target frame,
wherein the comparison between the first frame and the second frame is performed on the plurality of frames to be compared with all of the plurality of frames except for itself,
wherein, each time the comparison between the first frame and the second frame is performed on the first frame and the second frame, the frame evaluation value is added to the respective the first frame and the second frame,
wherein a frame having the highest frame evaluation value which is finally added, is determined as the output target frame.

15. The method according to claim 14, wherein positions of the first regions and the second regions are determined, with respect to each of the first frame and the second frame, such that more regions are arranged at a center portion of each of the first frame and the second frame than at an end portion thereof.

16. The method according to claim 14, wherein the plurality of frames included in the moving image are selected, according to an instruction by a user.

17. The method according to claim 14, wherein the first regions of the first frame combined comprise an area that is less than an area of the first frame and the second regions of the second frame combined comprise an area that is less than an area of the second frame, and
wherein a size of the first regions in the first frame and the second regions in the second frame are set such that a background region within the first regions and the second regions are minimized.

18. A computer-readable non-transitory storage medium storing a program for causing a computer to execute the method according to claim 14.

* * * * *